United States Patent [19] [11] 3,762,669
Curci [45] Oct. 2, 1973

[54] HIGH-SPEED HELICOPTER

[76] Inventor: Alfred Curci, 183 London Dr., Hamden, Conn.

[22] Filed: Nov. 2, 1971

[21] Appl. No.: 194,875

[52] U.S. Cl.................. 244/17.23, 416/19, 416/99, 416/111, 416/120, 416/170
[51] Int. Cl. ..................... B64c 27/08, B64c 27/12
[58] Field of Search...................... 416/99, 170, 100, 416/110, 111, 120; 244/17.11–17.27

[56] References Cited
UNITED STATES PATENTS

| | | | |
|---|---|---|---|
| 1,229,243 | 6/1917 | Eberhardt............................ | 416/99 |
| 1,274,886 | 8/1918 | Jacobson ............................ | 416/99 |
| 1,981,442 | 11/1934 | White ............................ | 416/111 X |
| 2,225,525 | 12/1940 | Pitcairn............................ | 244/17.21 |
| 2,589,826 | 3/1952 | Larsen ............................ | 416/111 |
| 3,181,816 | 5/1965 | Pfleiderer ........................ | 416/99 X |
| 3,246,861 | 4/1966 | Curci............................ | 244/17.23 X |

FOREIGN PATENTS OR APPLICATIONS

| | | | |
|---|---|---|---|
| 1,073,268 | 9/1954 | France.................................. | 416/99 |

Primary Examiner—Milton Buchler
Assistant Examiner—Paul E. Sauberer
Attorney—Walter Spruegel

[57] ABSTRACT

A helicopter craft has a fuselage with a longitudinal axis, and a rotary wing lift system providing at least two arms above and carried by the fuselage, with each arm radiating from and turnable about an upright axis intersecting the longitudinal axis of the fuselage. A variable-pitch lift blade is carried by each arm, with each blade radiating from and being turnable about an axis on the respective arm which is substantially parallel to and radially spaced from the rotary axis of the latter. The arms and blades are phased with each other, and they are power-driven at a one-to-one speed ratio in respective directions, to the end of achieving combined rotary sweep of each arm and associated blade through larger and smaller areas on opposite sides, respectively, of the longitudinal fuselage axis on which the sweep velocity is subtractive from, and additive to, forward flight velocity of the craft, respectively.

17 Claims, 9 Drawing Figures

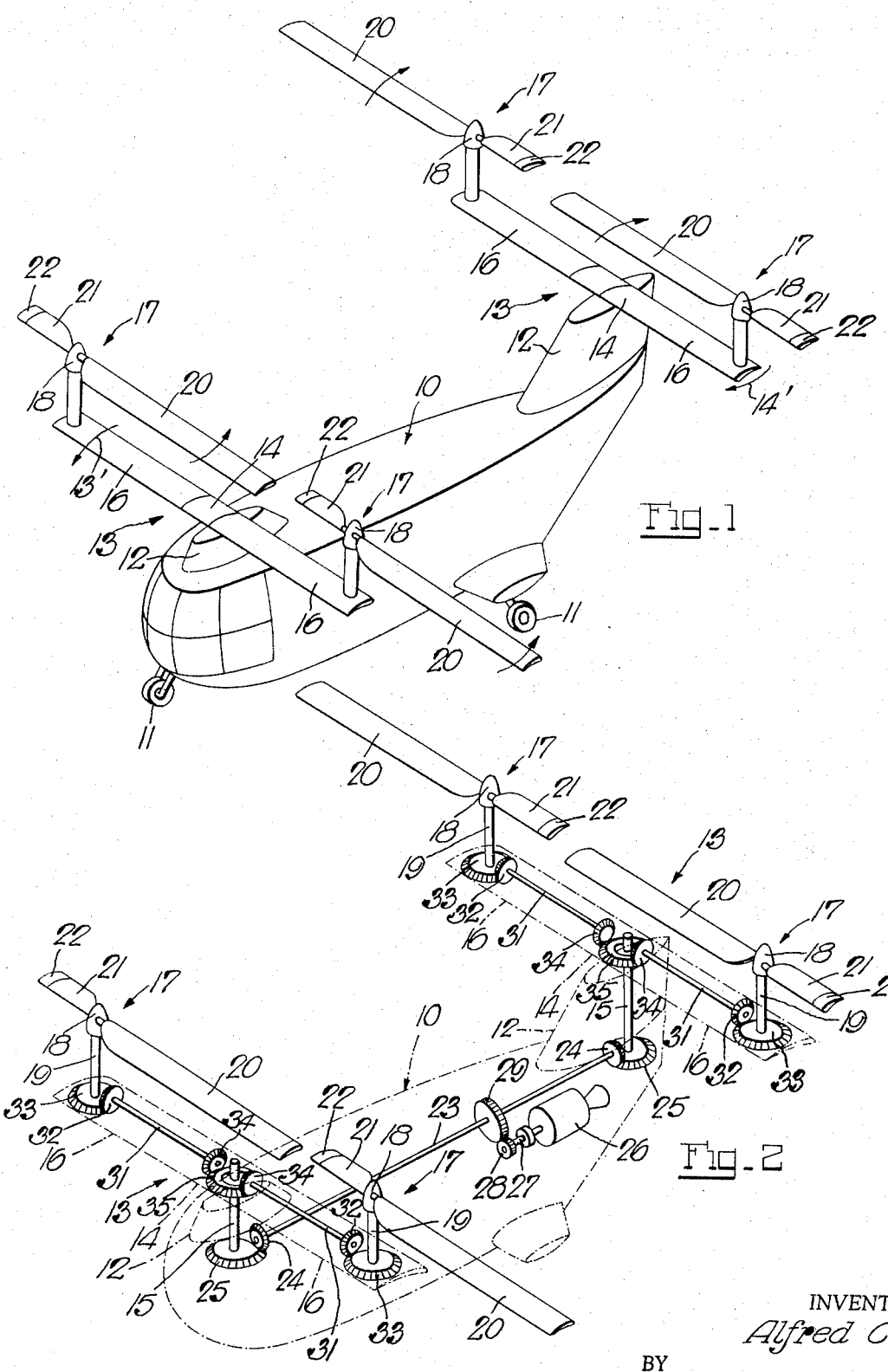

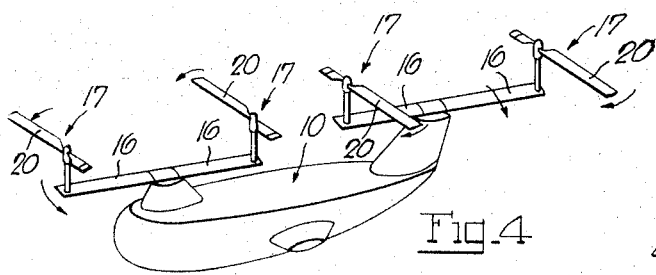
Fig.4
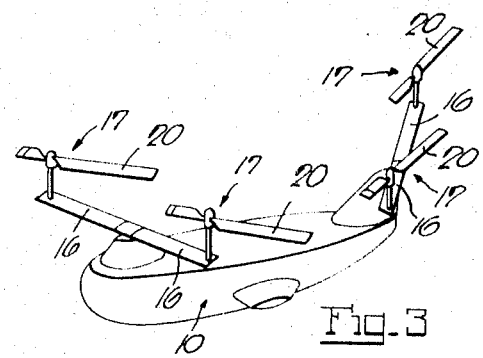
Fig.3
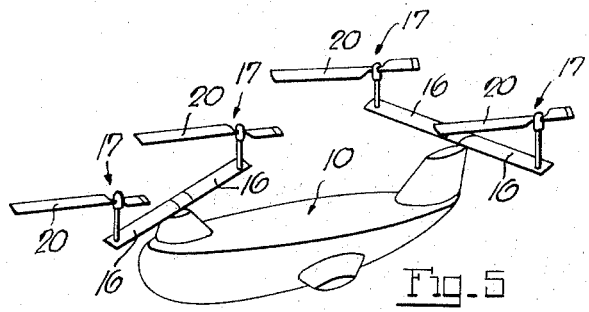
Fig.5
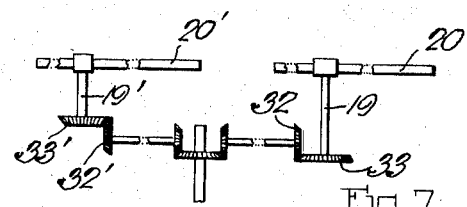
Fig.7
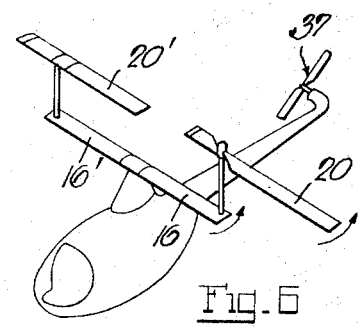
Fig.6
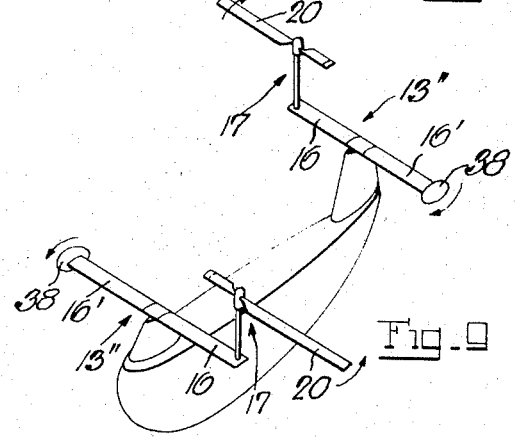
Fig.9
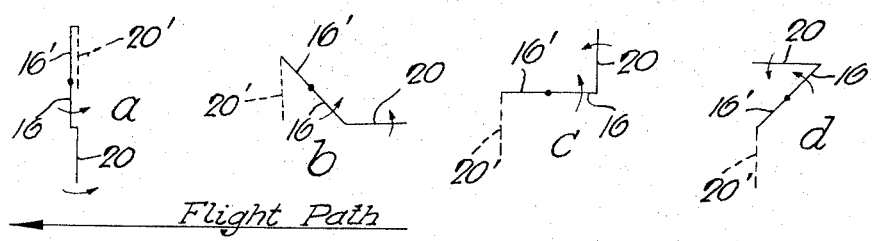
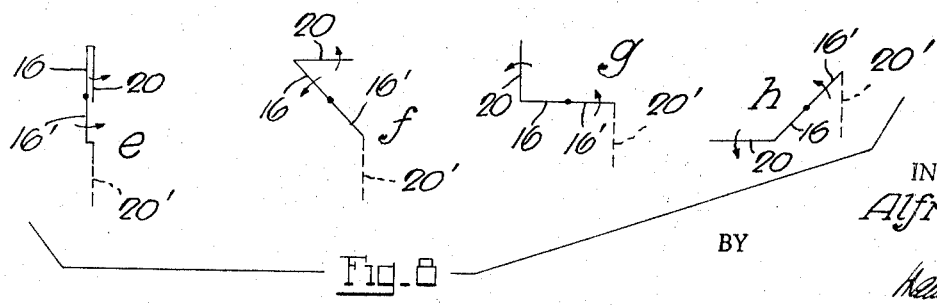
Fig.8
INVENTOR.
*Alfred Curci*

HIGH-SPEED HELICOPTER

The present invention relates to helicopter craft in general, and to helicopter craft of increased flight velocity in particular.

The aerodynamic conditions which limit the forward speed of a helicopter craft in flight are well known. Thus, pure helicopters are limited with respect to their maximum attainable forward speed because of the greatly varying impingement of air on the respective advancing and retreating blades in flight of the craft. On the advancing blade in flight, the air impinges on the blade with a velocity that is the sum of the flight velocity of the craft and the rotational blade velocity, while on the retreating blade, the air impinges on the blade with a velocity that is the difference between the flight velocity and the rotational blade velocity. Since blade lift is proportional to the square of the velocity of the air impinging on the blade and of the blade angle of attack, it follows that the retreating blade must operate at a larger angle of attack than the advancing blade to achieve a zero rolling moment of the craft. As flight velocity of the craft increases, the retreating blade operates in an air flow of decreasing velocity. Therefore, in order to achieve substantially equal lift across the rotary wing system, an angle of attack of the retreating blade larger than that of the advancing blade is required, but at a certain critical forward speed this attack angle becomes so large that the retreating blade encounters "stall", i.e., it no longer produces any lift, while on the advancing blade where the craft and rotary blade speeds are additive, the advancing blade tip approaches the critical Mach 1 Number (speed of sound) or "compressibility" state, at which stage power requirement for flight becomes prohibitive and destructive vibrations set in.

It is an important object of the present invention to provide a helicopter craft with a rotary wing lift system with which to attain forward speeds of the craft that are markedly greater than those heretofore attainable in crafts of this type.

It is another object of the present invention to provide a helicopter craft of the aforementioned greater forward flight speed, by operating the lift blades so that their effective sweep velocities may far surpass the heretofore permissible sweep velocities of such blades before being subjected to the speed-limiting conditions of stall and compressibility. Thus, while in prior blades the maximum sweep velocity is held at fairly well established limits due to the inevitable stall and compressibility conditions, the far greater permissible sweep velocity in the present craft makes for correspondingly greater lift and, hence, forward speed of the craft.

Another object of this invention is to provide a helicopter craft of the aforementioned greater forward speed, of which the lift blades of the rotary wing lift system are arranged to cyclically sweep a larger and smaller area on opposite sides of the longitudinal axis of the craft's fuselage.

It is a further object of the present invention to provide a rotary wing lift system of which the lift blade moving aft relative to the craft sweeps a larger area than the companion blade which advances relative to the craft.

Another object of the invention is the provision of a rotary wing lift system in which the sweep velocity of the retreating blade is far greater than the sweep velocity of the momentarily advancing blade.

These and other advantages of the present invention will be evident from the following description of the preferred embodiments of the invention shown in the accompanying drawings in which:

FIG. 1 is a perspective view of a helicopter according to the invention;

FIG. 2 is a similar perspective view of the helicopter showing certain operating components not shown in FIG. 1;

FIGS. 3, 4, and 5 show the same helicopter with the lift blades in momentary different relative angular positions;

FIG. 6 is a perspective view of a helicopter embodying the invention in a modified manner;

FIG. 7 is a diagrammatic view of exemplary drive and phasing provisons for the rotary wing system of the craft of FIG. 6;

FIG. 8a thru 8h diagrammatically show the relative positions of the lift blades at spaced intervals throughout one revolution of the rotary wing lift system of FIG. 6; and FIG. 9 is a perspective view of a helicopter embodying the invention in a further modified manner.

Referring now to FIGS. 1 and 2, the exemplary tandem rotor helicopter shown has a body or fuselage 10 of conventional design, and it is provided with a suitable landing gear 11. Extending upwardly from the front and rear portions of the fuselage are pylon fairings 12—12 over which are arranged exemplary fore and aft rotary wing lift systems 13 which are power operated for rotation in the opposite directions of arrows 13' and 14', so as normally to avoid any rotary torque reaction on the craft. Since the rotary wing lift systems are substantially similar in construction and function, a detailed description of only one rotor system will follow.

Each rotary wing lift system 13 includes a central section 14 suitably mounted on the upper end of a drive shaft 15 for rotation with the latter, with this shaft 15 extending upwardly through pylon fairing 12 and forming an axis of rotation for each rotor system. Opposed arms 16–16, which preferably have a fixed pitch being nonarticulated and nonfeathering, are fixed on and radiate from central section 14. While only two opposed arms 16 are shown in each rotor system of FIG. 1, it is fully within the ambit of the invention to provide section 14 with any different number of arms 16, including one. It is to be understood also that arms 16 may be simple lever extensions of section 14. Preferably, however, these arms 16 are airfoil sections so as to function as normal rotary lift blades.

Carried substantially at the outer ends of arms 16 are outboard rotor blade systems indicated generally at 17 and, being similar in construction and operation, only one need be described. Each rotor blade system 17 includes a hub 18 mounted on a vertically extending drive shaft 19 which is substatially parallel to and radially spaced from shaft 15. Suitably attached to and radiating from hub 18 is a variable-pitch lift blade 20. Also suitably attached to hub 18, substantially at a point diametrically opposite blade 20, is in this instance a relatively shorter variable-pitch lift blade 21 which has fixed to the free end thereof a weight 22 arranged for dynamically counter-balancing blade 20.

Although not shown, but as mentioned, the rotor blades 20 and 21 may be operated for pitch variation in any convenient manner well known in the art, and further may include any known mechanism for their interconnection with any known conventional pilot-operated and/or automatic control means for collective, cyclic, or differential collective pitch adjustments of these blades to provide rotor stability and attitude control of the craft during all flight regimes.

FIG. 2 shows schematically the power-operating means for the arms 16 and associated blades 20 of each rotor system, and comprising a driven synchronizing torque shaft 23 suitable journaled in and extending longitudinally of the fuselage 10 to interconnect the exemplary front and rear rotor systems 13—13. As shown, torque shaft 23 has fixed on opposite ends bevel gears 24—24 in driving engagement with companion gears 25—25 on the lower ends of rotor shafts 15—15. For driving shaft 23 there is mounted in the fuselage 10 a powerplant, such as a turbine engine 26, for example, having a power output shaft 27 carrying a suitable gear 28 in engagement with a gear 29 on the torque shaft 23. As will be noted, the power drive of shaft 23 in a given direction will drive shafts 15—15, together with the arm section 16 of the front and rear rotor systems 13—13 thereon, in opposite directions.

The power drive is transmitted from the power source to the blades 20 by means of suitably journaled shafts 31—31 extending longitudinally through each arm 16 to operationally interconnect the shafts 19 which carry for rotation in the same direction rotor blades 20—20. Fixed on the outer end of each shaft 31 is bevel gear 32 in mesh with bevel gear 33 on the lower end of each outboard rotor shaft 19. The inner end of each shaft 31 carries a suitable bevel gear 34 in meshing engagement with a normally non-rotating gear 35. Preferably, the gear 35 is suitably mounted so as to be non-rotatably disposed within pylon fairing 12. Passing through and suitably journaled concentrically with stationary gear 35 is rotor shaft 15, and as clearly evident in FIG. 2, power rotation of the latter in a given direction will cause bevel gears 34—34 to roll about stationary gear 35, thereby rotating shafts 31—31 oppositely, and, in turn, by means of meshing gears 32-33 and rotor shafts 19—19, turning blades 20 in the same direction as the arms 16 on the shaft 15. The above described power drive system is arranged so that each arm and associated blade form between them first angles varying from obtuse to 180° to obtuse, and second angles varying from acute to 0° to acute, during each rotation of the arm to opposite sides of the longitudinal axis of the aircraft.

The rotational direction of the arms 16 and associated blades 20 of each rotor lift system 13 in the same direction about their rotary axes is preferred. Also, the above-described rotor-driving means provides gearing of a one-to-one ratio, wherefore each blade 20 executes one revolution about its respective rotary axis while being bodily carried by its associated arm 16 through one revolution about the central or common rotary shaft 15. Additionally, and as seen in FIGS. 1 and 2, the phasing of the arms 16 and associated blades 20 is such that when either arm 16 is substantially normal to the longitudinal axis of the fuselage, the associated blade 20 is aligned with its arm 16, and extends radially away from the latter when operating on one side of the fuselage axis and, when operating on the opposite side of this fuselage axis, extends toward and in overlapping relation with its arm 16. Thus, as on the drive of each rotary blade system one arm 16 rotates forward (advances into the airstream) from its most aft position, the span or effective length of the associated blade 20 is thus non-additive to the span of the arm. On the other hand, as each arm 16 rotates aft (retreats or moves with the airstream) from its most forward position, the span of the blade 20 is additive to that of its arm. In the maximum condition, i.e., when the arm 16 extends normal to the fuselage axis, the length of the blade 20 is then fully additive to the length of the arm 16 (FIG. 2).

With the arrangement of the rotary blade systems shown and described, it will be noted that the arms 16 and associated blades 20 of the wing system are phased for combined rotary sweep through larger and smaller areas on opposite sides of the longitudinal axis of the fuselage, with each arm 16 and associated blade 20 arranged for sweeping a substantially larger area during their combined rotary movement on the retreating arm side than on the advancing arm side of the rotor system. Furthermore, because the companion arms 16 are driven at the same angular velocity, the combined rotary sweep of each arm 16 and associated blade 20 through the larger area will be at a greater sweep velocity than the combined rotary sweep of the same arm 16 and its associated blade 20 through the specified smaller area.

It will be remembered that in this example the fore and aft rotary wing lift systems are arranged for opposite rotation, with the rolling moment on the craft by one rotor system cancelling out the other rolling moment by the other rotor system, and therefore substantial stability normally is provided across the rotor systems. However, as stated heretofore, there may be suitable, well known effective provisions for positive trim and control of the rotor systems for maneuverability of the craft, and these may include any conventional pilot-operated and/or automatic control mechanism for varying the rotor blade pitch collectively or cyclically to provide attitude control of the craft during all flight conditions.

Referring now to FIGS. 6, 7 and 8, there is shown an embodiment wherein the present invention is uitlized on a rotorcraft having a single rotary wing lift system which, in this instance, includes a conventional anti-torque tail rotor 37. The general function and construction of the single rotor system of the modification basically is identical, except in one respect, with the multiple rotor systems in FIGS. 1 and 2. In the present modified form of the invention, the outboard blades 20' and 20 turn oppositely. As noted in FIG. 7, the meshing relationship between gears 32' and 33' has been transposed with respect to their relationship in FIG. 2, so that rotor shafts 19' and 19 together with their associated blades 20' and 20 turn oppositely, i.e., with blade 20 turning in the same exemplary manner of FIGS. 1 and 2, and blade 20' will be driven in a direction opposite to that of blade 20. In this arrangement, since the drive gearing is, as specified with reference to FIG. 2, of a one-to-one ratio, any relative rotation between arm 16' and its associated lift blade 20' is eliminated, and throughout their combined rotary movement or sweep, blade 20' is maintained with its longitudinal axis normal to the longitudinal craft axis and to the flight path of the craft, whereby on each longitudinal alignment of arms 16'-16 with the fuselage longitudinal axis, (FIGS. 8c and 8g) the respective associated blades 20' and 20 project with their outer ends to opposite sides, respectively, of the fuselage axis to provide substantially equalized lift force across the rotor system. For maintaining rotor stability and for providing maneuverability for the craft, the rotor lift blades may be arranged for pitch variations and be controlled in known manner, as aforesaid. Yaw control for the craft of this modification may be applied in the usual manner, as by the tail rotor 37, for example.

In the modified form of the invention of FIG. 9, each rotary wing lift system 13'' of the tandem rotor helicopter shown is provided with only one outboard rotor 17 having only one lift blade 20 carried on an arm 16. The oppositely extending companion arm 16' is suitably dynamically counterbalanced by weight 38, for example, and in this instance arm 16' may also be suitably arranged for pilot-controlled pitch variations, thereby providing supplementary rotor stabilizing and control means for the craft. In all other respects the modification of FIG. 9 is the same as the exemplary craft in FIGS. 1 and 2.

What is claimed is:

1. In a helicopter craft, the combination of a fuselage with a first longitudinal axis; and a rotary wing lift system, providing at least two arms above and carried by said fuselage, with each arm radiating from and turnable about an upright axis intersecting said first axis, a variable-pitch lift blade carried by each of said arms, with each blade radiating from and independently turnable about an axis on the respective arm substantially parallel to and radially spaced from the rotary axis of the latter, a power plant, and drive connections between said plant and arms and blades for the power drive of said arms and blades at a one-to-one speed ratio, with said drive connections being arranged to phase said arms and blades with each other and drive them in respective directions so that each arm and associated blade form between them first angles varying from obtuse to 180° to obtuse, and second angles varying from acute to 0° to acute, during each rotation of said arm substantially on opposite sides, respectively, of said first axis, for combined rotary sweep of each arm and its blade about the rotary axis of the former through larger and smaller areas on opposite sides, respectively, of said first axis, and with the velocity vectors parallel to said first axis of said combined rotary sweep of each arm and its blade through said larger and smaller areas being subtractive from, and additive to, forward flight velocity of the craft, respectively, said larger sweep areas of said arms and associated blades being also on opposite sides, respectively, of said first axis, and said blades being with their outer ends on opposite sides, respectively, of said first axis on each longitudinal alignment of either arm with said first axis.

2. The combination in a helicopter craft as in claim 1, in which said arms are driven in the same direction, and said blades are driven in opposite directions, respectively.

3. The combination in a helicopter craft as in claim 2, in which said arms are diametrically aligned, and radiate from and are turnable about a common upright axis intersecting said first axis.

4. The combination in a helicopter craft as in claim 3, in which each blade is aligned with its phased arm in the momentary positions of the latter substantially normal to said first axis.

5. The combination in a helicopter craft as in claim 4, in which said blades are of the same length, and their rotary axes are equally spaced from said common upright axis.

6. The combination in a helicopter craft as in claim 5, in which said blades are first lift blades, and said arms are further lift blades.

7. The combination in a helicopter craft as in claim 6, in which the rotary axes of said first blades are at the outer ends of the respective arms.

8. The combination in a helicopter craft as in claim 1, in which said arms are lift blades.

9. The combination in a helicopter craft as in claim 1, in which each blade is above the respective arm.

10. In a helicopter craft, the combination of a fuselage with a first longitudinal axis; and two rotary wing lift systems having second upright rotary axes, respectively, intersecting said first axis and spaced from each other longitudinally of said first axis, of which each system provides at least two arms above and carried by said fuselage, with said arms radiating from and turnable about one of said second axes, a variable-pitch lift blade carried by each of said arms, with each blade radiating from and independently turnable about an axis on the respective arm substantially parallel to and radially spaced from said one second axis, a power plant, and drive connections between said plant and arms and blades for the power drive of said arms of each system in the same direction and at a one-to-one speed ratio and for the power drive of said blades of the same system also in said same direction and through one revolution for each revolution of the respective arms, with said drive connections being arranged to phase said arms and blades so that each arm and associated blade form between them first angles varying from obtuse to 180° to obtuse, and second angles varying from acute to 0° to acute, during each rotation of said arm substantially on opposite sides, respectively, of said first axis, for combined rotary sweep of each arm and associated blade about the rotary axis of the former through larger and smaller areas on opposite sides, respectively, of said first axis, and with the velocity vectors parallel to said first axis of said combined rotary sweep of each arm and its blade through said larger and smaller areas being subtractive from,and additive to, forward flight velocity of th craft, respectively, and said systems being phased with each other for combined rotary sweep of each arm and associated blade of both systems through said larger area on opposite sides, respectively, of said first axis and in opposite rotary sweep directions, respectively.

11. The combination in a helicopter craft as in claim 10, in which said arms of each system are lift blades.

12. The combination in a helicopter craft as in claim 10, in which said arms of each system are diametrically aligned.

13. The combination in a helicopter craft as in claim 12, in which each blade of each system is aligned with its phased arm in the momentary positions of the latter substantially normal to said first axis.

14. The combination in a helicopter craft as in claim 12, in which said blades of each system are of the same length, and their rotary axes are equally spaced from the respective second axis.

15. The combination in a helicopter craft as in claim 12, in which all blades are of the same length, and their rotary axes are equally spaced from the respective second axes.

16. The combination in a helicopter craft as in claim 10, in which said blades of each system are first blades, said arms of each system are further lift blades, and the rotary axes of said first blades of each system are at the outer ends of the respective arms.

17. The combination in a helicopter craft as in claim 10, in which each blade of each system is above the respective arm.

* * * * *